United States Patent
Thompson et al.

(10) Patent No.: US 8,024,292 B2
(45) Date of Patent: *Sep. 20, 2011

(54) CREATION OF A SINGLE SNAPSHOT USING A SERVER JOB REQUEST

(75) Inventors: Dianne C. Thompson, Bellevue, WA (US); Carolina P. Uhlmann, Seattle, WA (US); Janet L. Schneider, Bellevue, WA (US); Eric A. Herrmann, Snohomish, WA (US); Patrick M. Simonich, Kent, WA (US); Nathan A. Kryger, Snoqualmie, WA (US)

(73) Assignee: EMC Corporation, Hopkinton, MA (US)

( * ) Notice: Subject to any disclaimer, the term of this patent is extended or adjusted under 35 U.S.C. 154(b) by 457 days.

This patent is subject to a terminal disclaimer.

(21) Appl. No.: 11/169,419

(22) Filed: Jun. 29, 2005

(65) Prior Publication Data

US 2007/0006018 A1    Jan. 4, 2007

(51) Int. Cl.
*G06F 7/00* (2006.01)
(52) U.S. Cl. ........ 707/640; 707/661; 707/802; 711/162; 714/12; 714/15
(58) Field of Classification Search .................. None
See application file for complete search history.

(56) References Cited

U.S. PATENT DOCUMENTS

| | | |
|---|---|---|
| 6,243,824 B1 | 6/2001 | Kakuta |
| 6,732,125 B1 | 5/2004 | Autrey et al. |
| 6,799,258 B1 | 9/2004 | Linde |
| 6,865,655 B1 | 3/2005 | Andersen |
| 6,910,112 B2 | 6/2005 | Berkowitz et al. |
| 6,948,038 B2 | 9/2005 | Berkowitz et al. |
| 7,162,599 B2 | 1/2007 | Berkowitz et al. |
| 7,237,045 B2 | 6/2007 | Beckmann et al. |
| 7,237,076 B2 | 6/2007 | Nakano et al. |
| 7,246,211 B1 | 7/2007 | Beloussov et al. |
| 2003/0158861 A1 | 8/2003 | Sawdon et al. |
| 2003/0158862 A1 | 8/2003 | Eshel et al. |
| 2003/0182301 A1* | 9/2003 | Patterson et al. ............. 707/102 |

(Continued)

FOREIGN PATENT DOCUMENTS

CN    1575568    2/2005

OTHER PUBLICATIONS

How VERITAS Storage Foundation TM for Windows Integrates with and Enhances Windows Server 2003 Volume Shadow Copy Service. VERITAS Software Corporation. Nov. 20, 2003.

(Continued)

*Primary Examiner* — Tim T. Vo
*Assistant Examiner* — Hasanul Mobin
(74) *Attorney, Agent, or Firm* — Workman Nydegger

(57) ABSTRACT

Systems and methods for backing up and/or restoring data. When a backup operation is initiated, systems and methods are provided for creating a single snapshot of the backup items, including backup groupings. The single snapshot is used by a backup/recovery application to perform a save process on each backup grouping. By using the same snapshot, the backup is performed based on the same point in time so that the backed up data across the client system is consistent and synchronized. When a recovery operation is initiated, recovery items (e.g., backup groupings, writers and writer components) are selected from backup grouping of the client.

23 Claims, 11 Drawing Sheets

U.S. PATENT DOCUMENTS

| | | | |
|---|---|---|---|
| 2004/0010487 | A1 | 1/2004 | Prahlad et al. |
| 2004/0133588 | A1 | 7/2004 | Kiessig et al. |
| 2004/0141498 | A1 | 7/2004 | Rangan et al. |
| 2004/0236916 | A1 | 11/2004 | Berkowitz et al. |
| 2004/0250033 | A1 | 12/2004 | Prahlad et al. |
| 2005/0015663 | A1 | 1/2005 | Armangau et al. |
| 2005/0028022 | A1 | 2/2005 | Amano |
| 2005/0081099 | A1 | 4/2005 | Chang et al. |
| 2005/0273557 | A1 | 12/2005 | Tabuchi et al. |
| 2007/0005914 | A1 | 1/2007 | Thompson et al. |
| 2007/0005915 | A1 | 1/2007 | Thompson et al. |
| 2007/0006017 | A1 | 1/2007 | Thompson et al. |

OTHER PUBLICATIONS

Legato NetWorker Administrator's Guide Release 6.0. Legato Systems, Inc. Aug. 2000. pp. 276, 312, 502.
Paragon Drive Backup Enterprise Server Edition, Best Practices for MS Exchange Server. [retrieved on Aug. 8, 2007 from the Internet] <URL:http://download.paragon-software.com/doc/Best$_{13}$ Practices_MS_Exchange_Server.pdf>.
VERITAS Backup Exec 9.1 for Windows Servers. VERITAS Software Corporation. Jan. 21, 2004.
Sankaran, Guinn, Nguyen. "Volume Shadow Copy Service Helps Build an Integrated Backup System". Power Solutions. Mar. 2004.
Symantec Backup Exec Quick Recovery and Off-Host Backup Solutions. Symantec. Jan. 2007.
Quick Recovery for Microsoft Exchange 2003 using VERITAS Storage Foundation for Microsoft Windows and HP Storage—white paper. Hewlett-Packard Development Company, L.P. Sep. 2004.
Why Windows Storage Server 2003 for your NAS Solution? Microsoft. Corporation 2002.
Backup and Restore Technologies. Jun. 18, 2003 [retrieved on Aug. 8, 2007]. Retrieved from the Internet <URL:http://searchwincomputing.techtarget.com/searchWinSystems/downloads/Naik_ch05.pdf>. pp. 137-173.
Sun StorEdge Enterprise Backup Software 7.1 Administrator's Guide. LEGATO Systems, Inc. Sep. 2003. pp. 1-2.
VERITAS Storage Foundation 4.0 for Windows Solutions Guide Windows Server 2003. VERITAS Software Corporation 2003. pp. 1-2.
VERITAS Storage Foundation 4.1 for Windows Solutions Guide Windows 2000, Windows Server 2003. VERITAS Software Corporation 2004. pp. 1-2.
VERITAS Storage Foundation 4.1 for Windows Administrators Guide Windows 2000, Windows Server 2003. VERITAS Software Corporation 2004. pp. 1-2.
VERITAS Storage Foundation 4.1 for Windows Solution's Guide for Microsoft Exchange Server Windows 2000, Windows Server 2003. VERITAS Software Corporation May 2004. pp. 1-2.
How Volume Shadow Copy Service Works. Microsoft Corporation. [retrieved on Aug. 8, 2007] Retrieved from the Internet <URL:http//technet1.microsoft.com/windowsserver/en/library/2b0d2457-b7d8-42c3-b6c9-59c145b7765f1033,nsox?mfr=true>. Mar. 28, 2003.
Use of Components by the Requester (Windows). Microsoft Corporation. [retrieved on Aug. 8, 2007] Retrieved from the Internet <URL:http://msdn2.microsoft.com/en-us/library/aa384628.aspx>. Jul. 2, 2007.
IVssBackupComponents::AddComponent. Microsoft Corporation. [retrieved on Aug. 8, 2007 from the Internet] <URL:http://msdn2.microsoft.com/en-us/library/aa382646.aspx>. Jul. 2, 2007.
Overview of Actual File Restoration. Microsoft Corporation. [retrieved on Aug. 8, 2007 from the Internet] <URL:http://msdn2.microsoft.com/en-us/library/aa384575.aspx>. Jul. 2, 2007.
Overview of Actual Backup Initialization. Microsoft Corporation. [retrieved on Aug. 8, 2007 from the Internet] <URL:http://msdn2.microsoft.com/en-us/library/aa384577.aspx>. Jul. 2, 2007.
Overview of Processing a Restore under VSS. Microsoft Corporation. [retrieved on Aug. 8, 2007 from the Internet] <URL:http://msdn2.microsoft.com/en-us/library/aa384590.aspx>. Jul. 2, 2007.
Writer Metadata Document Life Cycle. Microsoft Corporation. [retrieved on Aug. 8, 2007 from the Internet] <URL:http:// msdn2.microsoft.com/en-us/library/aa384998.aspx>. Jul. 2, 2007.
Overview of Restore Initialization. Microsoft Corporation. [retrieved on Aug. 8, 2007 from the Internet] <URL:http://msdn2.microsoft.com/en-us/library/aa384592.aspx>. Jul. 2, 2007.
Microsoft Windows Server 2003. Introduction to Shadow Copies of Shared Folders. Microsoft Corporation, Mar. 2003.
Microsoft Windows Server 2003. Windows Server 2003 Active directory Fast Recovery with Volume Shadow Copy Service and Virtual Disk Service. Microsoft Corporation, Aug. 2003.
Microsoft Windows Storage Server 2003. NSI Software. NSI Solutions with Microsoft VSS. Microsoft Corporation, Mar. 2004.
Office mailed Jun. 1, 2007 for U.S. Appl. No. 11/170,015.
Office mailed Jun. 1, 2007 for U.S. Appl. No. 11/169,853.
Office mailed Aug. 14, 2007 for U.S. Appl. No. 10/935,551.
Office mailed Sep. 7, 2007 for U.S. Appl. No. 11/169,418.
Office mailed Sep. 27, 2007 for U.S. Appl. No. 10/978,025.
U.S. Appl. No. 10/935,552, filed Sep. 5, 2008, Final Office Action.
U.S. Appl. No. 11/169,418, filed Aug. 14, 2008, Office Action.
U.S. Appl. No. 11/169,418, filed Feb. 5, 2009, Final Office Action.
U.S. Appl. No. 11/170,015, filed Nov. 1, 2007, Final Office Action.
U.S. Appl. No. 11/170,015, filed Dec. 16, 2008, Notice of Allowance.
U.S. Appl. No. 11/169,853, filed Nov. 1, 2007, Final Office Action.
U.S. Appl. No. 11/169,853, filed Feb. 11, 2009, Notice of Allowance.
U.S. Appl. No. 11/170,015, filed Apr. 10, 2008, Advisory Action.
U.S. Appl. No. 11/169,853, filed Feb. 21, 2008, Advisory Action.
U.S. Appl. No. 11/169,418, filed May 29, 2008, Advisory Action.
U.S. Appl. No. 10/935,552, filed Jan. 16, 2009, Advisory Action.
U.S. Appl. No. 11/169,418, filed Aug. 2, 2009, Office Action.

* cited by examiner

CREATION OF A SINGLE SNAPSHOT USING A SERVER JOB REQUEST

BACKGROUND OF THE INVENTION

1. The Field of the Invention

The present invention relates to systems and methods for backing up data. More particularly, embodiments of the invention relate to systems and methods for backing up and recovering data using a single client snapshot.

2. The Relevant Technology

In this society where many personal and business interactions are data driven, data can become easily lost or corrupted due to events such as system failures, viruses, power outages, etc. Backing up data has become an important feature of computer networks because of this increasing dependence upon computers and networks to perform vital business and personal functions. The ability to easily, accurately and reliably access data is expected by anyone accessing a computer and/or network. When a computer or network must be "down" to backup or restore lost data, such down time can critically impact personal and business processes. The demand for uninterrupted access to data corresponds to a need for software and hardware that can meet the demand to provide data and services.

Backup and recovery of data is typically accomplished through the use of software that backs up the data and that recovers the data from the backup copy. As the amount of data continues to increase, backing up and recovering the data becomes more complex. Gigabytes of data cannot currently be quickly transferred from one directory to another and taking a directory offline for backup purposes is an unattractive option.

In addition to backing up file systems, it is becoming more necessary to back up other types of data such as applications and services. However, applications and services often have open files when a backup is initiated. Open files generally cannot be effectively backed up using conventional systems, and are often skipped during backup operations. As a result, additional applications are often needed to help manage backups of open files and to administrate backup logs for files that were skipped during backup.

Operating systems present another challenge to software and systems that back up data. The complexity of operating systems often requires operating systems to be backed up in a logical unit to preserve the state of the system or client. A partial backup of an operating system may result in inconsistencies or system failure if the operating system is restored from a partial or incomplete backup. In other words, backing up the file system itself does not effectively back up the state of the system and may result in errors when recovered. Operating systems are often used with databases or other directories of data that need to be backed up while preserving the state of the system. In addition, operating systems as well as applications and services are often distributed across computer systems, a fact that complicates an effective backup and recovery of the data.

The desire to provide uninterrupted service combined with increased storage requirements creates the need for systems and methods for backing up data quickly and with minimal interruption to applications and services.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
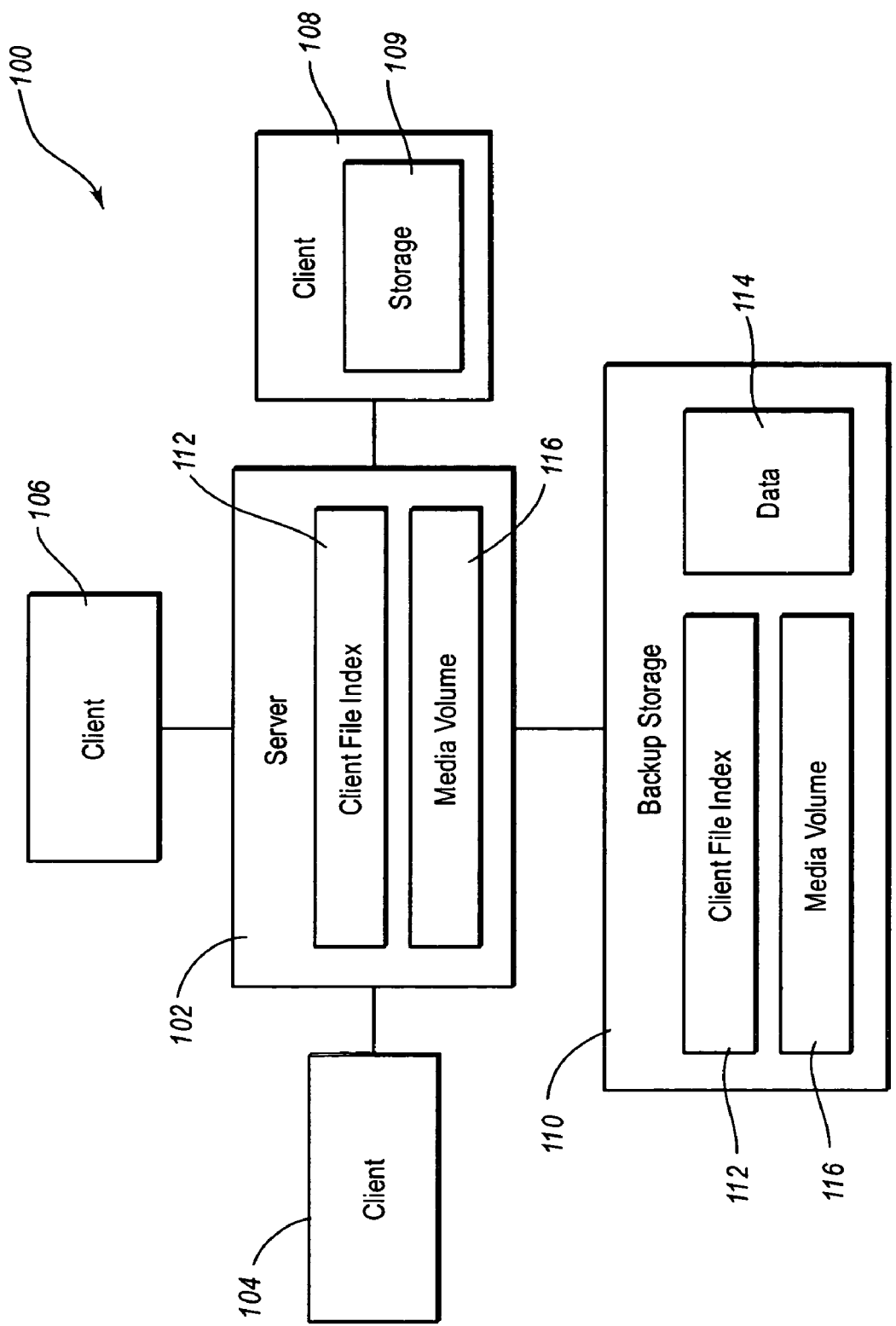
FIG. 1 illustrates an exemplary environment for implementing embodiments of the present invention.

Embodiments of the present invention relate to systems and methods for selectively backing up and/or recovering data. As used herein, the term "data" may include, but is not limited to, directories (e.g., volumes, file systems, and the like), user data, system data, applications, services, operating systems, and the like, that can be stored on one or more storage devices of a client. Backing up or recovering the operating system may include backing up or recovering any of the data herein defined or understood by those of skill in the art. Data may be organized in logical directories that do not necessarily correspond to a particular storage device. Even though data may exist on many different storage devices, data can be organized into logical directories and subdirectories so that a user can easily locate information. In one example, in Windows® operating system, the main directories are referred to as volumes. Volumes include, for example, the C drive and D drive, which are typical volumes of storage that are located on a client, even though the C or D drive itself may comprise a stack of hard disks. It is not necessary for a user to know from which particular disk to obtain information. Thus, directories exist to help a user navigate through the data on the client. Other directories may exist to which the client has access through a network. In addition, as will be described further below, directories and subdirectories can be organized into backup groupings that can be selected to perform a backup or restore of the data corresponding to the backup grouping.

Still other directories may exist specific to a particular function of the client. For example, in Windows® operating system, certain data related to preserving the operating system state of the client can be organized into an operating system state volume (herein referred to as the VSS volume). Furthermore, the VSS volume may include other applications and/or services that can be used to restore data on the client. For a VSS volume, more than one storage device may be involved and the data for the VSS volume may reside in different storage devices of a client computer, such as the C drive, D drive and/or other drives. The VSS volume is thus simply a logical organization for locating data, but does not represent an actual set of storage devices. However, in one embodiment, all of the data pertaining to the VSS volume could be located in a single distinct storage device rather than distributed on multiple storage devices on the client.

The Windows® operating system is used exemplarily herein to describe the present invention. However, it should be appreciated that the systems and methods of backing up and restoring a client can also apply to other operating systems. For example, other operating systems would typically desire that some or all aspects of an operating system state be backed up. In addition, other operating systems utilize directories or file systems to assist a user in navigating through the data residing on a client. Thus, the term "directory" can be used interchangeably with the term "volume" or "file system" to refer to any means of logically organizing data on a client.

Systems and methods of the invention utilize a single snapshot to allow a point-in-time copy of the client's data at a single point in time. A snapshot is a read-only point-in-time replica or representation of the original data or contents of one or more volumes so that an actual copy can be made on another local or remote storage device. A single snap shot allows synchronized backup of some or all of the data in a client across multiple volumes and/or subdirectories at a single point in time so that a user is ensured that when restoring or accessing the backed-up data, all of the backed-up data of a client is synchronized to a particular point in time. The point in time copy on the local or remote storage device includes useful backups of previously open files and also provides backing up the operating system state. This enables the operating system to be recovered as a logical unit without corrupting the operating system state of the system. Embodiments of the invention further enable components of a client or system to be selectively backed up and/or restored.

Typically, a user will choose to select all of the backup groupings relating to the volumes of a client or computer to be backed up. In this case, the single snapshot captures a representation of all the data of the volumes of a client or computer at a single point in time, allowing, for example, the operating system state to also be consistent with a single point in time. However, less than all of the backup groupings may be selected by the user which specifies that less than all of the data of a client should be backed up. This may be beneficial where the user knows that changes have occurred only in certain backup groupings without performing a backup of the entire client data system. A user may select one or more backup groupings by accessing a user interface that communicates with a backup/restore application. Backup groupings may include information that identifies the items that need to be backed up. Because the items identified in a backup grouping may be distributed among multiple volumes, embodiments of the invention can ensure that the corresponding volumes are included in the single snapshot and that the corresponding data is properly backed up, as will be discussed further below.

When a backup is performed, the system that is processing or controlling the storage of the data that is to be backed up requests the client to temporarily freeze or suspend operation. During the suspended operation, a single snapshot of the data is created. After the single snapshot is created, the application and/or services are directed to resume operation while the backup is performed from the single snapshot. The suspended operation allows open files to be captured and reflected in the single snapshot. Open files are therefore not skipped in the backup. Also, the service or application being backed up is notified before the creation of the single snapshot and is given time to pause and prepare for back up. Thus, the backup/restore application ensures that transactions are suspended and that the data to be backed up is in a consistent state.

1. Overview of Exemplary Environment for Backing Up Data

FIG. 1 illustrates an exemplary system for creating snapshots of network data and backing up/restoring network data that can be adapted for use with the invention. Although the system of FIG. 1 can be used to back up data according to the invention, embodiments of the invention can also be practiced in other networks that have data to be backed up. FIG. 1 illustrates a server 102 that has a relationship with client(s) that are represented by the clients 104, 106, and 108. Each client 104, 106, and 108 may have data on a storage volume that is local and/or remote with respect to the respective client. The storage volume represents one or more volumes or drives of the client as well as applications and services. The client 108, for instance, has storage 109 that contains data (including applications, services, and/or volumes). Also, services represent a type of application and may therefore be referred to as applications herein.

Each client 104, 106, and 108 represents a system with data to be backed up. Each client can be relatively simple (e.g., a desktop computer) or relatively complex (e.g., a large database server or one of a cluster of servers). The client may further be a node on a network or a storage device on a storage area network (SAN). Each client 104, 106, and 108 may also operate under a different operating system or platform than the server 102. In the context of a backup operation, a client may operate under the control of the server 102.

As used herein, the term "user" may refer to a person operating the server 102 (e.g., administrator). Alternatively, the user may refer to a person at the client 104, 106 and/or 108. Both types of users would be able to initiate a request for backup or restore, although it will be appreciated that the server 102 may have additional functionalities not available to the client 104, 106 or 108. A user may establish a schedule that defines the times at which the server 102 automatically performs a backup operation on the data of clients 104, 106, and/or 108. However, users on the clients can also initiate ad hoc backup operations and recover operations. In the example of FIG. 1, the server 102 has access to backup storage 110 where one or more copies of the client's data is stored. The backup storage 110 can be located in the server 102 or may be distinct and separate from the server 102. The data 114 represents the data that has been backed up by the server 102 on the back up storage 110.

The server 102 typically controls and directs all server-initiated backup operations or processes. The client controls ad hoc backup and recover operations. Data is backed up, in one embodiment, using backup groupings. However, even where backup groupings are employed, a single snapshot of the client system is used to perform the backup of the backup groupings.

The single snapshot is useful where it is desirable that critical components of the operating system state be backed up and recovered as a consistent unit. In other words, an operating system may include files or data that define the state of the operating system at any given time. When the server 102 performs a backup of a system, it ensures that the appropriate backup groupings associated with the operating system are backed up using the same snapshot to ensure that the operating system is backed up at a consistent point in time of the client. A client may include other applications or services, in addition to the operating system specific applications and services that also have components that should be backed up as a consistent unit. For example, as discussed above, in Windows® operating systems, these applications and services along with operating system state components can be located in the VSS volume. However, client data can be organized and/or grouped in any suitable manner depending on design considerations.

Referring back to FIG. 1, the server 102 also stores and manages a client file index 112 and a media volume 116 both on the server itself and on the backup storage 110. The client-file index 112 is an index of the backed up data items. The media volume 116 is an index of the backup volumes. The client file index 112 and the media volume 116 are collectively referred to herein as the "online indexes". The online indexes are typically stored on the backup storage 110 after the backup operation is complete. However, it will be appreciated that other operating systems may use similar data structures for maintaining the directories and items that are backed up in order to be able to restore the directories and items during recovery.

2. Exemplary System for Creating a Single Snapshot

Figure 2:
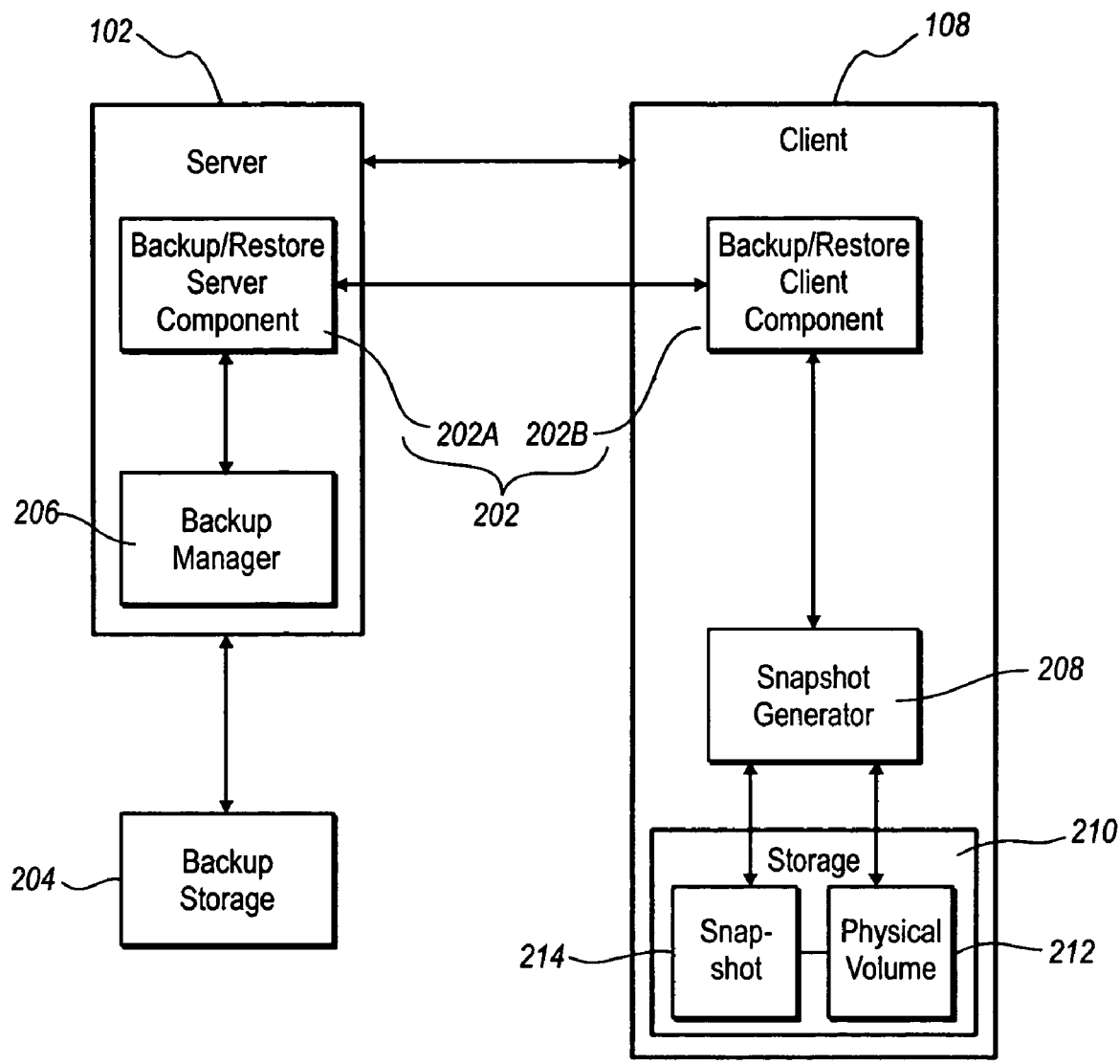
FIG. 2 illustrates an exemplary system for performing backup and/or recover operations.

Turning briefly to FIG. 2, an exemplary system for creating the single snapshot and performing a backup and restore operation is illustrated. As shown therein, a backup/restore application 202 initiates the backup/restore operations. As used herein, the backup/restore application can also be referred to as a requestor or, in other words, an application requesting a backup or restore operation. Through the backup/restore application 202, a user can select all or particular backup groupings to backup or restore. For example, in the embodiment of FIG. 2, the backup/restore application 202 could have a server component 202A and a client component 202B that communicate to implement a backup or restore function. While the server component 202A and client component 202B are parts of an overall backup/restore application 202, it will be appreciated that the server component 202A and client component 202B will be different where necessary in order to allow the server 102 and client 108 to perform their various respective functions. Where portions of the backup/restore application 202 are bifurcated or even trifurcated, it will be appreciated that the arrangement of components shown in FIG. 2 may differ, and that the system of FIG. 2 is provided by way of example and not by limitation. In less typical embodiments, the backup/restore application 202 can reside solely on the server (in which case the server would take on characteristics of a client) or solely on a client (in which case the client would take on characteristics of a server). As shown in FIG. 2, the backup/restore application 202 is in communication with a backup storage 204 which the backup/restore application accesses in order to perform the backup and/or restore functions.

The server component 202A communicates with a backup manager 206, located on server 102. As will be discussed further below, backup manager 206 participates in the backup process by generating various job requests for the client component 202B during the creation of a single snapshot.

The client component 202B initiates a snapshot generator 208 which initiates creation of the single snapshot. The snapshot generator 208 requests suspension of operations on the system on which the backup is taking place, for example, client 108, as needed until the snapshot is created. The snapshot generator 208 communicates with storage 210 containing physical data 212 from which the single snapshot 214 is created.

3. Exemplary Backup Groupings for use in Backing Up/Restoring Data

As discussed above, the client data or items to be backed up can include, but is not limited to, volumes, user data, system data, applications, services, operating systems, and/or the like. The client data can be organized into directories or volumes, the volumes also having a hierarchy of sub-directories, and displayed on a user interface that communicates with a backup/restore application. In addition, the hierarchy makes it easier for a user to specify particular volumes or subdirectories to backup. The volumes and subdirectories can also be organized in terms of "backup groupings," which are herein defined as a collection of data or items that are backed up during a backup session between the server 102 and a particular client, e.g., client 108. A backup grouping can therefore include an entire volume, less than an entire volume, or data distributed on one or more volumes, the backup grouping including, but not limited to, a group of files, an entire file system, application-generated data such as a database or operating system information, and the like. A backup grouping may also include applications or services or components of applications, services, and/or operating systems distributed on one or more volume. To illustrate one example in which a backup grouping includes information located on more than one volume, a backup grouping may encompass information that relates to the operating system state, but which information is located on different volumes. Thus, the term backup grouping is used as an organizational tool for identifying and locating files that may logically belong together.

Some operating systems include writing components that operate with applications or services in order to store information on a storage device. For example, in Windows® operating system, the writing components are referred to as "writers." Thus, the term "writer" and "writing components" will be used interchangeably to refer to any component that provides this functionality. Further, the writing components can interact with backup/restore hardware and software including snapshot generating hardware and software. Generally, a writer corresponds to at least one application or service to be backed up. The data associated with writers in a backup grouping may further be located in different volumes, subdirectories, and the like. For example, a writer can store data to more than one volume. In addition, some volumes are not associated with any writers. Thus, it is possible that a backup grouping could correspond to information stored on a volume that is associated with writers, a volume not associated with any writers, or both.

One or more files on the client may be related to the operating system state. In one embodiment, as mentioned above, backup groupings can be used for organizing files related to the operating system state of the client. For example, Microsoft® provides the Volume Shadow Copy Service and a VSS volume framework can be provided for backing up the operating system state of a client operating on Windows®. In addition, as mentioned above, the VSS volume includes other applications and/or services that include writers. The VSS volume provides an organizational tool to backup data relating to the operating system state. Saving backup groupings pertaining to the operating system state of the client allows a user to recover their operating system and return it to a previous state if needed and can be important where a user loses an operating system drive or the entire machine. Otherwise, the user would have to rebuild their system, reconfiguring services, and reinstalling and reconfiguring applications.

Figure 3A:
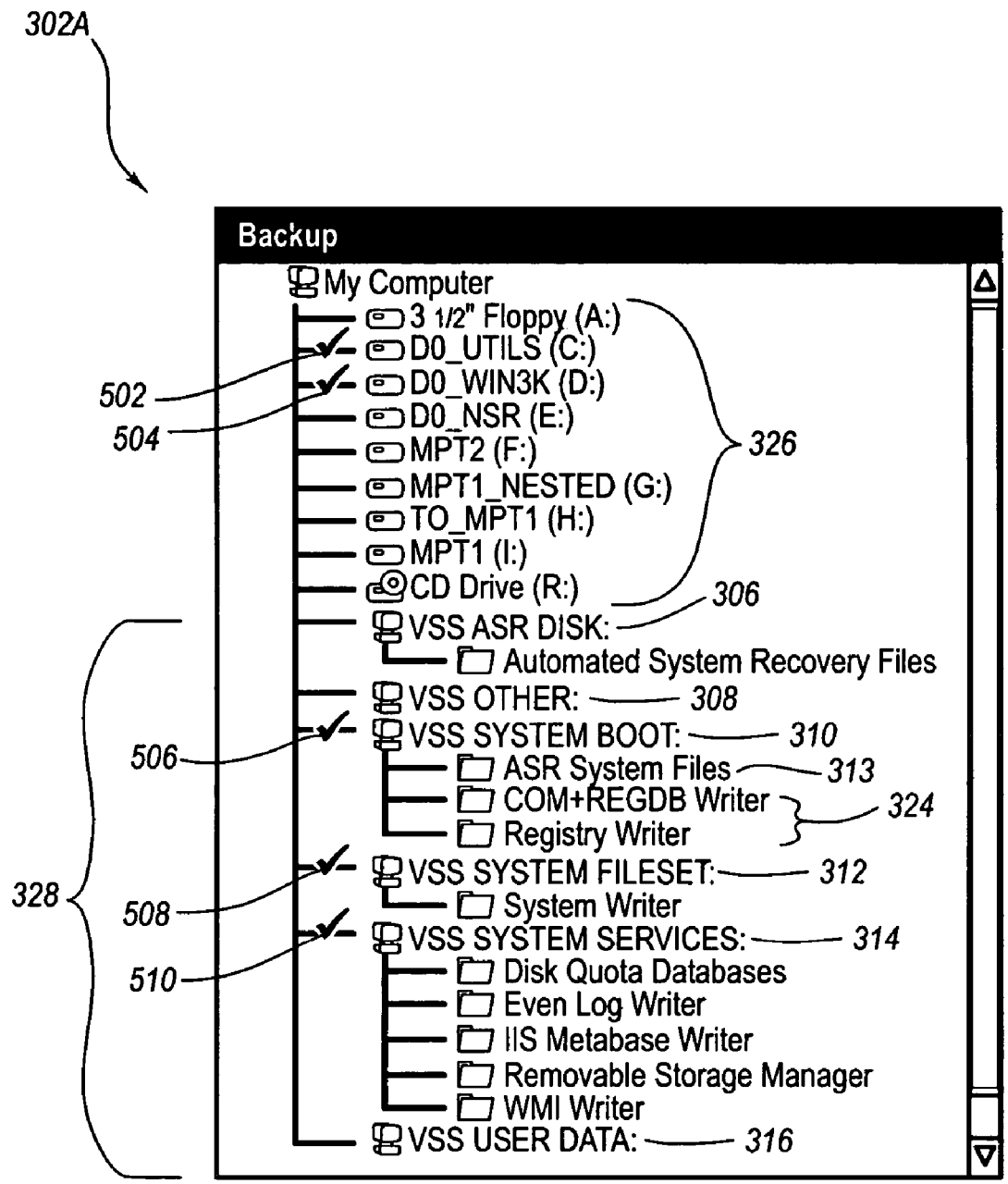
FIG. 3A illustrates an exemplary user interface for organizing backup groupings.
Figure 3B:
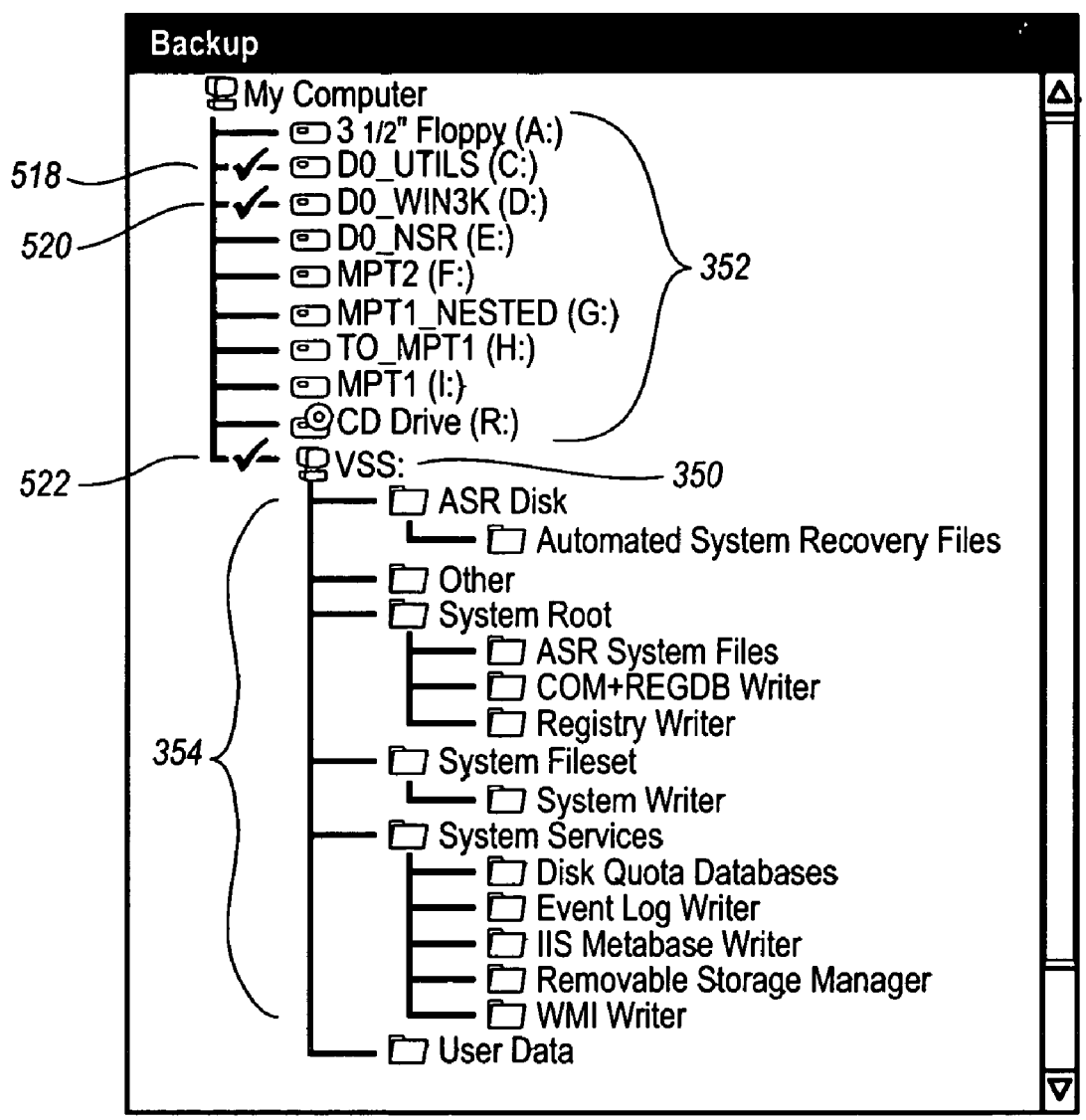
FIG. 3B illustrates another exemplary user interface for organizing backup groupings.

The Windows® operating system implementing Volume Shadow Copy Service combined with a logical VSS volume described herein is only an exemplary way of organizing backup groupings relating to client data. Other operating system platforms can use similar or different methods of organizing backup groupings for data related to a client. However, using the example of a Windows® operating system, FIGS. 3A and 3B illustrate two examples of user interfaces 302A, 302B, each having different ways for organizing backup groupings of a client. The user interfaces 302A, 302B may be associated with a backup/restore application, which is described in further detail below. The user may interact with the user interface 302A or 302B to select particular backup groupings to be saved. Alternatively, the user may simply list the backup groupings to be backed up without using a user interface. Further, it is possible for the user to select "all" backup groupings to be backed up. Indeed, where the user is concerned about a consistent backed up operating system state, the user would likely select all backup groupings, at least those relating to the VSS volume, to be backed up.

FIG. 3A illustrates an interface 302A that includes a plurality of volumes, each identified by a particular alphanumeric character and commonly referred to as drives (e.g., A: drive, C: drive, D: drive, and the like). A plurality of VSS backup groupings 328 are also provided for backup/restore functions. As shown in FIG. 3A, the backup groupings 326 related to certain volumes of the system and backup groupings 328 related to the operating system state are in the same tree. In contrast, in FIG. 3B, the backup groupings 354 related to a main VSS volume are arranged under a tree 350.

Referring to FIG. 3A as an example, but which may also apply to FIG. 3B, backup groupings 328 includes backup groupings 306, 308, 310, 312, 314, and 316, which are system backup groupings and may include operating system writers and writer components. Because many components of the system backup groupings 328 may have interdependencies, it is preferable that the user select all of the backup groupings 328 (i.e., those backup groupings relating to preserving the operating system state of the client) so that a single snapshot can be created for all of the backup groupings and the save for each backup performed using the single snapshot. The back up all of the system's backup groupings will be done using the same snapshot. This ensures that the operating system state of the client can be restored in a consistent manner should restoration be required. However, as discussed above and reflected in FIG. 3A, it is possible for a user to select less than all of the backup groupings related to the operating system state of the client to be backed up and those selected backup groupings will be backed up using a single snapshot.

In one embodiment, backup groupings 328, 354 are dynamically populated and the content of the backup groupings 328, 354 may be determined dynamically based in part on which writers are active on the client. When the writers of a client are enumerated or identified, writers of the same type become writers in a particular backup grouping. Thus, the writers associated with a particular backup grouping have the same type. For example in FIG. 3A, the writers 324 each have the same type and are included in the backup grouping 310. If a writer for a particular application or service is not available (i.e., inactive or nonexistent), the appropriate files may be backed up via the file system when the corresponding volume (s) are selected for backup. For a given backup operation, some of the backup groupings may include active writers while others may not include any writers.

The above discussion of writers should not be construed to require writers to be associated with every volume or backup grouping. It is possible for a volume to not be associated with any writers. It is further possible for a backup grouping not to be associated with any writers if the information corresponding to the backup grouping is located on a volume that is not associated with writers. Volumes can also be associated with writers, but not associated with any of the backup groupings related to the operating system state.

It will be appreciated that the present invention does not require that every backup grouping actually be backed up every single time. That is, a user can specify certain backup groupings to be backed up. Thus, the logical organization of FIGS. 3A and 3B may result in differences where a user selects less than all of the backup groupings to be backed up. For example, the organization of FIG. 3A provides certain backup groupings relating to the operating system state to be organized as main directories so that they can be selected. As shown in FIG. 3A, a user may select or list system drive D, VSS System Boot, and VSS User Data to be backed up, if the user so desires. In contrast, in FIG. 3B, the VSS backup groupings are all organized as subdirectories under one main VSS volume, so that a user is able to select the entire VSS volume. For example, as shown in FIG. 3B, a user can select or list, as the case may be, the system C drive, the system D drive, and the VSS volume to be backed up. By selecting the VSS volume, the entire operating system state directory including all of the backup groupings relating to the operating system state will be backed up every time the VSS volume is selected. The configuration of FIG. 3B may be more desirable to make it easier for a user to identify, using a single selection (i.e., VSS:), all of the backup groupings relating to the operating system state since in some situations it will be desired to ensure that the operating system state is consistent every time a backup of operating system state data occurs. However, the user is also able to select sub-groupings relating to the operating system state if so desired without being required to select all of the operating system state subgroupings.

Whether the user selects all or only some of the backup groupings to be backed up, a single snapshot is created from the volumes corresponding to the selected backup groupings. So, for the example of FIG. 3A, a single snapshot would be created from the C drive volume, and D drive volume. In addition, the volumes that correspond to the VSS System Boot backup grouping, the VSS System Fileset backup grouping and the VSS System Services backup grouping will be included in the single snapshot. In one embodiment, the volumes corresponding to the VSS backup groupings may actually be the C drive volume and the D drive volume so that no additional volumes need be included in the single snapshot. In another embodiment, volumes in addition to those corresponding to the selected VSS backup groupings may be indicated so that additional volumes may be included in the single snapshot. For FIG. 3B, the single snapshot could be created from the C drive volume, the D drive volume, and volumes associated with the VSS volume backup grouping (which, again, could correspond with information located on volumes already included in the single snapshot, e.g., C drive volume and D drive volume). In either case, after the single snapshot is created, the backup process for each of the backup groupings would use the same snapshot from which to base the backup operation. Thus, the backup of the selected backup groupings (or the entire client system, if desired) would reflect a back up at a single point in time.

As described in the foregoing exemplary process, the backup manager 206 on server component 202A causes the snapshot generator 208 on client component 202B to initiate a single snapshot for use in performing a save process of the backup groupings. This provides a more consistent recovery than is provided with conventional backup programs. For example, when installing a new piece of hardware, a new driver often also needs to be installed. Normally, the new driver contains information relating to its operation. Some of this information is stored within one operating system writer and additionally data is stored in one or more files on the hard drive which could belong to another writer. This information is accessed as needed by the operating system and is required for the driver to work properly. One of those writers storing the driver data may be in one backup grouping while another writer containing files with driver data may be in a different backup grouping. If both backup groupings are not saved from the same snapshot, it is possible that one portion of the information would not be synchronized with the other.

In contrast, the present invention provides that where a single snapshot of the volumes corresponding to the selected backup groupings is created at a single point in time, server 102 directs client 108 to use the single snapshot to perform the save of each of the backup groupings. Further, backup groupings that share files are ensured that the shared file is updated at the same point in time which minimizes the chance that important information will be left out. Thus, the present invention provides that backed up data is based from a single point in time reference provided by the single client snapshot so that the selected data that is actually backed up is based from the same point in time. The type of backup may vary. For example, an incremental backup may be performed for certain backup groupings. Alternatively, a full backup could be performed.

In the Windows® operating system embodiment, when a backup grouping containing writers is being backed up, however, a full backup of all of the writers in the backup grouping is typically performed to preserve a the operating system state of the client or to preserve the state of the application or service being backed up. In some instances, one of the writers of the backup grouping may not be backed up. This can occur, for example, when the data associated with that writer has not changed. Performance of the backup can be improved, particularly if the application identified by the writer is large. In other words, refraining from backing up a large application that has not changed can improve backup performance. If the data of the application has changed, however, a full backup of the application is typically performed.

Figure 3C:
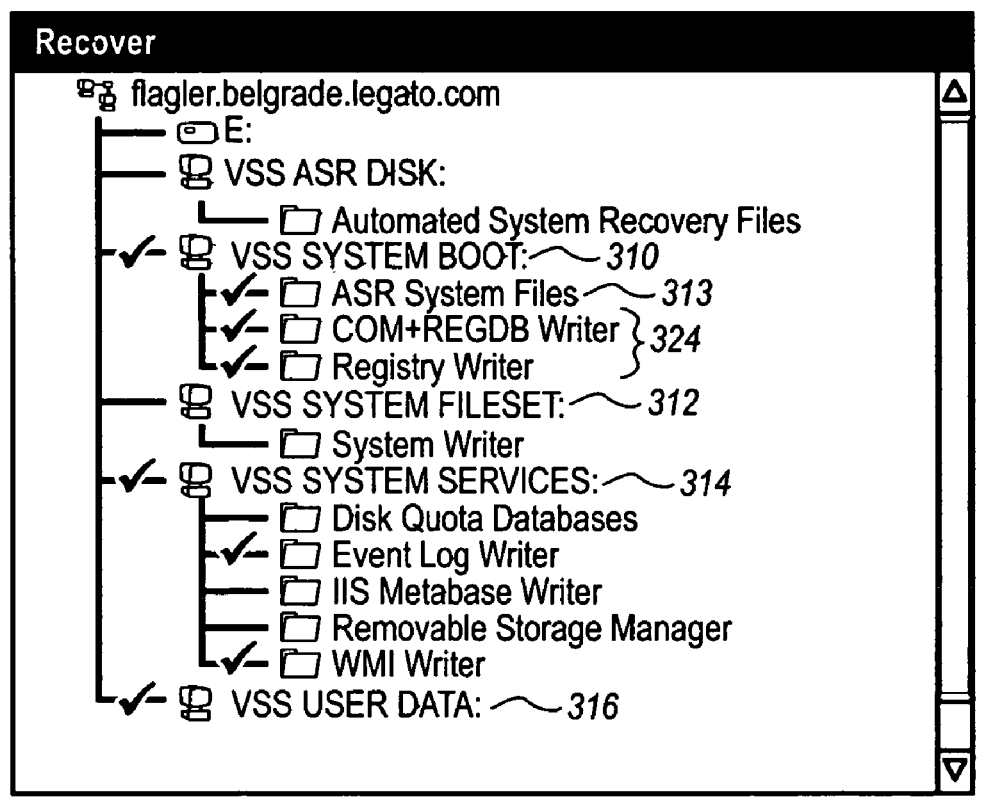
FIG. 3C illustrates an exemplary user interface for recover operations.
Figure 3D:
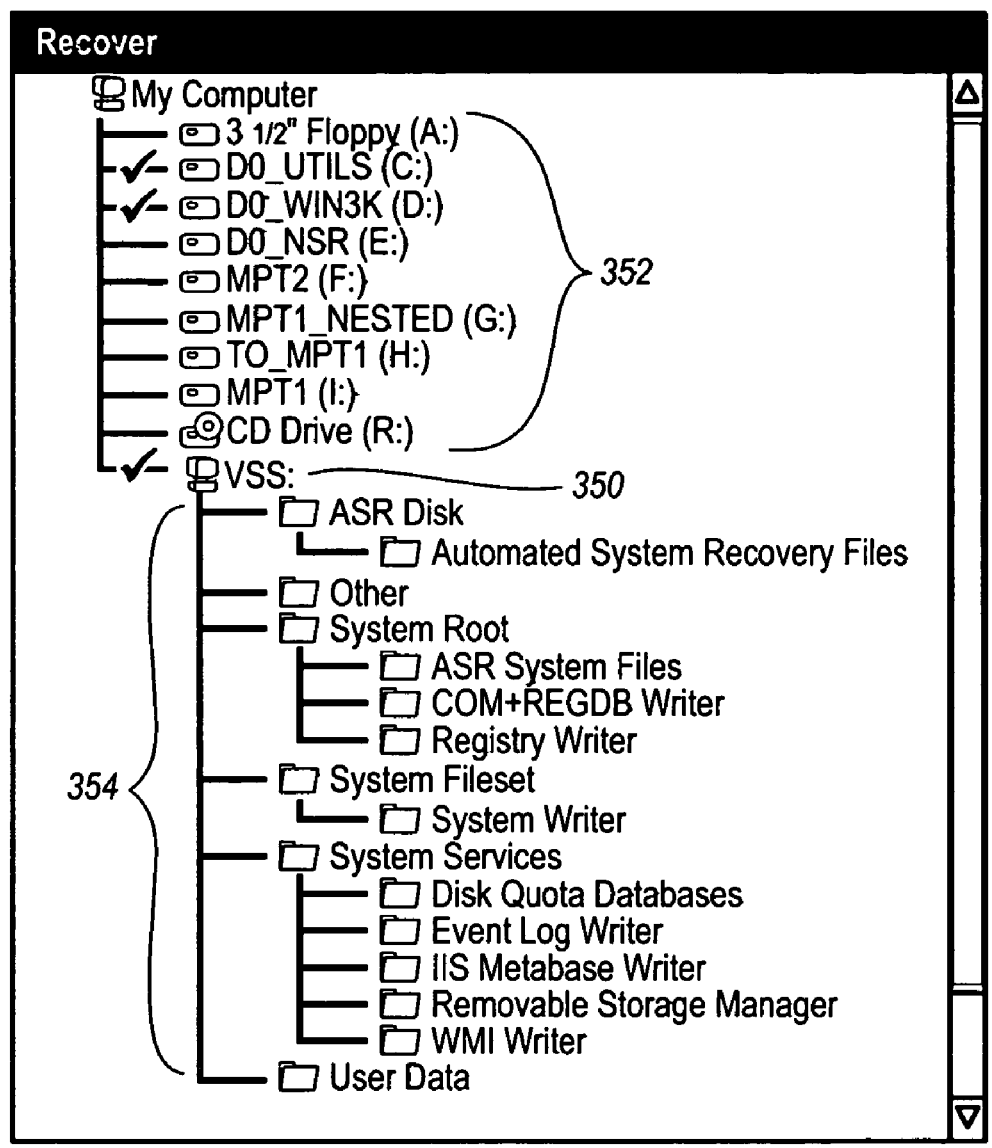
FIG. 3D illustrates another exemplary user interface for recover operations.

FIGS. 3C and 3D further illustrates exemplary user interfaces for selectively recovering data on a client running on Windows® operating system. In FIG. 3C, interface 302C shows that the backup grouping 310 and 314 have been selected for recovery. Further, subgroupings, e.g., in the backup grouping 310, the writers 324 and component 313 can be selected for recovery without selecting the entire backup grouping 310 to be recovered. FIG. 3D illustrates a recovery interface 302D that corresponds to the logical organization of FIG. 3B, but has essentially the same function and purpose as the interface 302C of FIG. 3C.

4. Exemplary Method for Creating a Single Snapshot

Figure 4A:
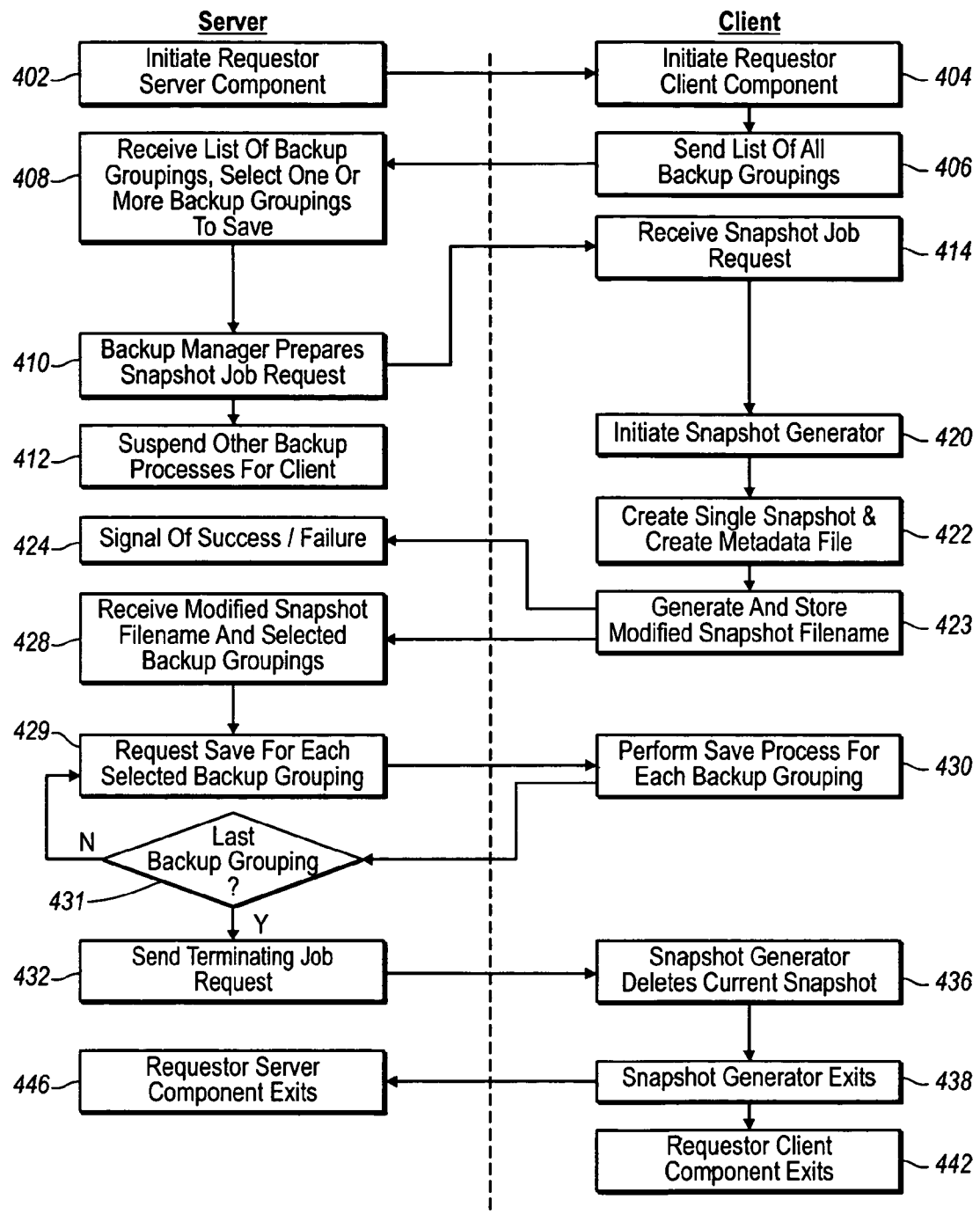
FIG. 4A illustrates an exemplary flow chart for creating and using a single snapshot.

With reference to FIG. 4A, an exemplary process for creating a single snapshot for use in backing up client data using the exemplary system of FIG. 2 will now be described in further detail. FIG. 4A illustrates how the client and server interact, in one embodiment, to create a single client snapshot. At 402, the backup/restore application server component 202A is initiated on the server 102. At 404, the server component 202A initiates the backup/restore application client component 202B on the client. At 406, the client component 202B generates a list of all possible backup groupings for that client and sends it back to the server component 202A.

Figure 4B:
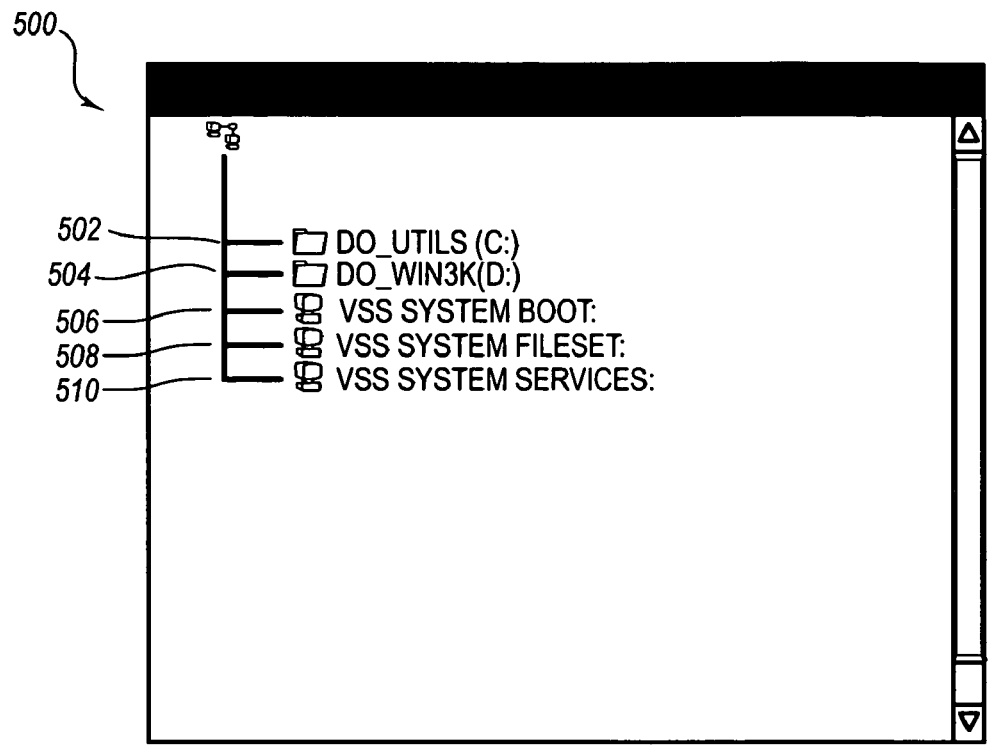
FIG. 4B illustrates an exemplary listing of backup groupings based on the selections of backup groupings illustrated in FIG. 3A.
Figure 4C:
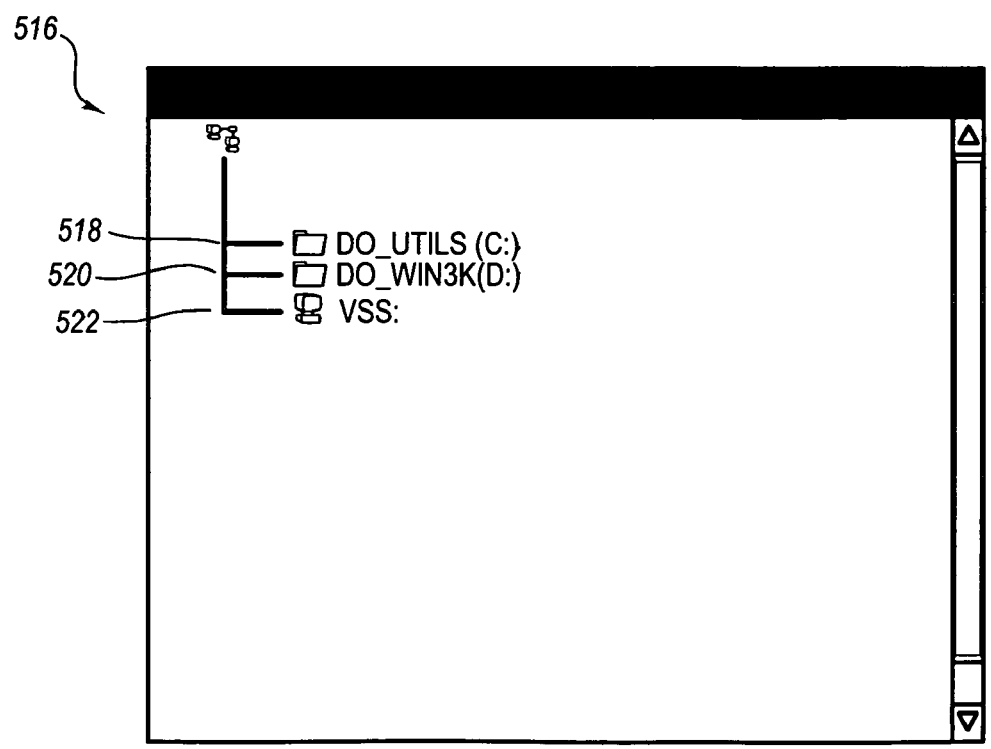
FIG. 4C illustrates an exemplary listing of backup groupings based on the selections of backup groupings illustrated in FIG. 3B.

At 408, the server component 202A receives the listing of backup groupings so that the user can select one or more of the available backup groupings to be backed up. As discussed above, the user can select all of the backup groupings or only specific backup groupings to be backed up. FIGS. 4B and 4C illustrates what a list of selected backup groupings might look like based on the user interface selections illustrated in FIGS. 3A and 3B. For example, as shown in FIG. 4B, backup groupings 502, 504, 506, 508 and 510 have been selected by a user for backup. Analogously, FIG. 4C illustrates that the selected backup groupings 518, 520 and 522 are identified by the user to be backed up. In another embodiment, the user may first select the backup groupings based on a listing of potential backup groupings that are likely available at the client and then the selections can be compared to a list of actual backup groupings available at the client. Other variations are also possible.

As used herein, the term "user" refers to anyone making the selection of which backup groupings to be backed up. Thus, the user can refer to a person operating a client computer or an administrator operating the client computer via a server or other graphical user interface. The user can select the backup groupings to be saved at any point in time before a backup. For example, a user can opt to select a preconfigured backup group selection, this same selection being used for a series of prescheduled backups. In one embodiment, the client component 202B is configured so that all of the backup groupings are preconfigured to be saved every time a backup is performed. This embodiment can ensure that the operating system state is backed up at a consistent reference point every time a backup is performed. However, as mentioned above, it is also possible for a user to select only certain backup groupings to be backed up and to perform this selection process each and every time before a backup is performed.

At 410, server component 202A accesses backup manager 206. It will be noted that backup manager 206 can be initiated at any point in time during the backup operation. Backup manager 206 generates a snapshot job request to generate a single snapshot for the identified backup groupings. The snapshot job request includes a list of the selected backup groupings to be included in the single snapshot as well as a command to start certain components on the client component 202B that generate the single snapshot. As described below, the client 108 uses the listing of selected backup groupings to identify the directories associated with the selected backup groupings. Alternatively, the snapshot job request can include a list of directories to include in the single snapshot, eliminating the need for client 108 to go through the motions of identifying the directories associated with the backup groupings.

At 410, the server component 202A sends the snapshot job request to the client component 202B. At 412, by sending the snapshot job request, server component 202A knows not to send any other requests for backups to that particular client and to wait until a signal is received from the client component 202B that the generation of the single client snapshot was a success or failure. If generation of a single snapshot fails, the backup/restore application 202 can use a default procedure for generating the snapshot of each selected backup grouping individually instead of grouped together in a single snapshot.

At 414, client component 202B receives the snapshot job request. At 420, execution of the snapshot job request initiates snapshot generator 208 which will start creation of the single snapshot. Backup manager 206 on server component 206A stays active waiting for a signal from snapshot generator 208 that the snapshot creation is complete.

At 422, snapshot generator 208 orchestrates the creation of a single snapshot by managing the identification of all of the volumes corresponding to the selected backup groupings identified in the snapshot job request. In one embodiment, snapshot generator 208 can include all of the identified volumes in a copy set and requests the creation of a snapshot. The term copy set is used to refer to the grouping of the volumes that are to be included in the single snapshot. A copy set can be a listing or other identification of the volumes that should be included in a single snapshot. Where the snapshot job request includes a listing of directories, the snapshot generator 208 does not have to go through the steps of identifying the directories associated with the backup groupings and can simply create a copy set using the directories identified in the snapshot job request.

Because each operating system creates snapshots differently, the details of creating a snapshot will not be described here, but are described further below using an exemplary system. Once the snapshot is created, the snapshot is associated with a pathname so that a backup/restore application can later locate the snapshot. As discussed further below, the client component 202B suspends writer operations on the client 108 while the single snapshot is being created. In addition, in one embodiment, metadata is also generated with the single snapshot.

If the snapshot is successful, at 423, snapshot generator 208 adds to the snapshot the metadata that is generated at the time the single snapshot is created to include additional information useful for performing a save or backup process. In addition, a filename is created for locating the modified snapshot file wherever the modified snapshot file is stored on the client 202B. This will be described in more detail below. At 424, a signal is sent to the server component 202A that the creation of the snapshot is successful. This indicates to the server component 202A that it no longer needs to access backup manager 206. Server component 202A prepares for the save process. Snapshot generator 208 stays alive until all the save processes for the selected backup groupings are complete and until the snapshot is deleted.

Also at 423, the backup manager 206 returns the modified snapshot filename to server component 202A, which is received at 428 by server component 202A. In some embodiments, this action may serve to notify the server component 202A that the creation of the single snapshot was successful instead of creating a separate action 424. In any event, receipt of the modified snapshot filename indicates to the server component 202A that it may now begin the save process.

At 429, server component 202A begins sending save job requests to the client component 202B to save the selected backup groups. The server component 202A also sends the filename of the modified snapshot file with each save request. At 430, the client component 202B uses the selected backup groups and modified snapshot filename to begin the save process for each backup grouping. Performing a save process (i.e., back up) of each backup grouping can vary depending on the backup/restore application, so an exemplary process will be described in more detail below. However, generally, the backup/restore application uses the backup group listing identified in the snapshot job request to identify which backup groups should be saved.

Decision block 431 represents that server component 202A moves subsequently through the other backup groupings selected by the user. In one embodiment, decision block 431 queries whether the present backup grouping is the last backup grouping. As discussed above, the user can specify for all of the backup groupings to be backed up or can select only specific backup groupings. In either case, the server component 202A moves sequentially through the selected backup groupings, sending the modified snapshot filename with each backup grouping save request so that client component 202B knows from where to access the snapshot to retrieve the required data.

The server component 202A thus directs the saves of the backup groupings by sending an individual save job request for each selected backup grouping to client component 202B. Alternatively, the server component 202A may send one single save job request to the client component 202B to perform saves for all of the backup groupings identified by the user. In any case, the snapshot generator 208 remains alive during the processing of all of the saves of the backup groupings.

In one embodiment, after the saves for the selected backup groupings are complete, at 432, server component 202A sends a terminating job request to client component 202B to delete the snapshot. At 436, receiving this terminating job request causes snapshot generator 208 to delete the current snapshot. At 438, snapshot generator 208 exits. At 442, client component 202B exits. At 446, the server component 202A exits.

It will be appreciated by those of skill in the art that the exemplary process described above is provided by way of illustration and not by way of limitation and that process steps and/or actions can be rearranged in order and combined or eliminated and that other actions may be added due to design considerations depending on the operating system platform and/or backup/restore application running on the client. For example, instead of deleting the single snapshot, the existing snapshot could be used as a basis for a second snapshot. That is, pointers to changes made between the time the first snapshot was taken and the second snapshot are maintained in a list of pointers. The new list of pointers is used to update the first snapshot to create the second snapshot.

As discussed above, various operating systems use different systems or methods of creating snapshots and also of performing backup and recovery. Referring briefly back to FIG. 2, a snapshot 214 is an exact representation of at least a portion of what is contained in the physical storage 212 at an exact point in time. Unlike the physical storage 212 which can be read and written, snapshot 214 is read only.

In another embodiment, using, for example, the copy on write method, the snapshot 214 is a differential representation of changes made to the physical storage 212 between two points in time. An original copy at a first point in time contains a copy of the physical storage 212 before it is overwritten with new changes. When a change to the physical storage 212 occurs, the pointer can be placed on the area that is changed and the pointer maintained in a list of pointers stored on the physical storage 212. Using the list of pointers and the original copy, a snapshot 214 can be created that represents at least a portion of the physical storage 212 at the point in time in which the snapshot was created.

The single snapshot can be generated using a system provider, software provider, and/or hardware provider. A provider is defined broadly herein as hardware or software that creates and maintains snapshots. An example of a system provider is a software provider specific to a particular operating system. For example, Windows® operating system has a default preinstalled software provider for creating snapshots, but other operating systems may also have similar functionality located thereon. A software provider intercepts I/O requests at the software level between the file system and the backup/recovery volume manager. Thus, a software provider could be a software application specifically maintained to create and/or maintain snapshots. A hardware provider manages snapshots at the hardware level by working in conjunction with a hardware storage adapter (e.g., a specific storage array) or controller. Any suitable system provider, software provider, and/or hardware provider may be used to execute a single snapshot according to the teachings of the present invention. In addition, the system provider, software provider, and/or hardware provider may be part of the code of a backup/restore application so that the request to execute a single snapshot and the actual execution of a single snapshot is made by the same application. Other configurations are also possible in light of the teachings herein.

Figure 5:
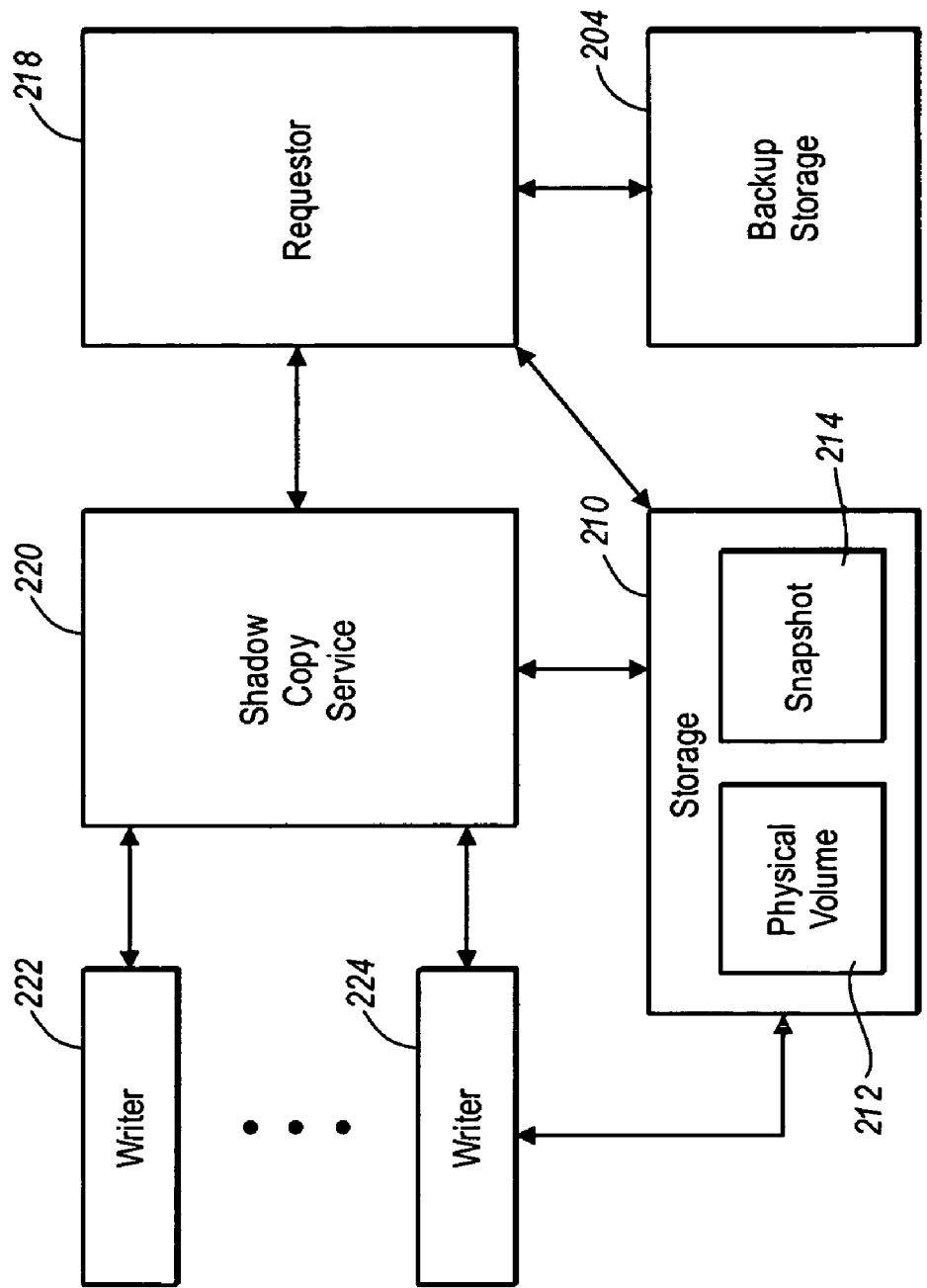
FIG. 5 illustrates an embodiment of a system for generating a snapshot.
Figure 6:
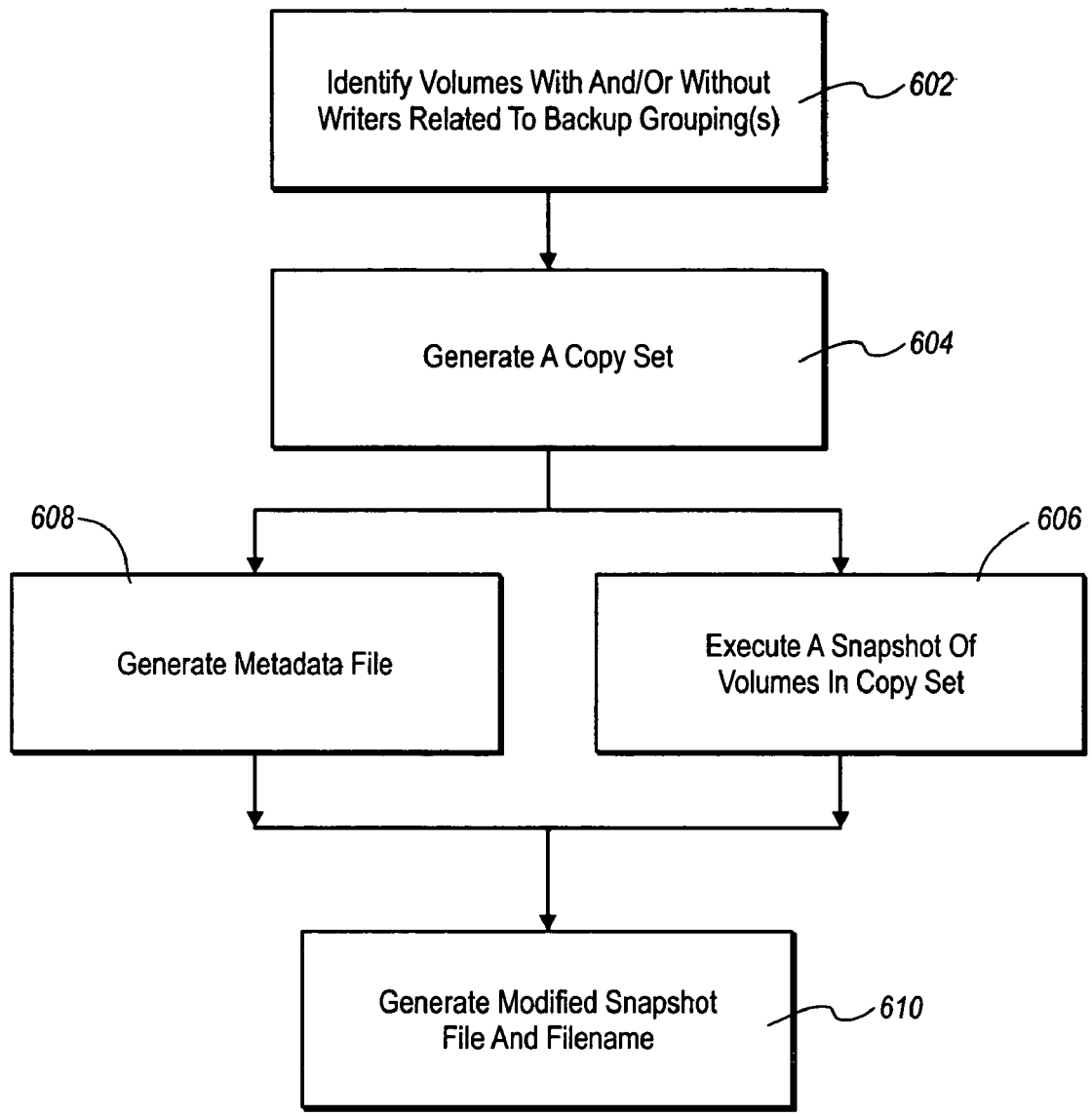
FIG. 6 is an exemplary flow chart for generating a snapshot.

With reference now to FIGS. 5 and 6, an exemplary system and method for creating a snapshot is described that is representative of a system that is implemented with Windows® operating system. It will be appreciated that some components are the same as described in FIG. 2, and that like elements will be referred to with like reference numerals. Further, other operating systems may use similar or equivalent components or different components in order to execute a snapshot. In FIG. 5, a requestor 218 initiates the components of the operating system to create a snapshot. The requestor 218 is generally any application that requests that a snapshot be taken. In one embodiment, the requestor 218 can be the backup/restore application 202, backup manager 206, and/or snapshot generator 208. Because it is not critical to define what the requestor 218 is, only that it directly or indirectly requests that a snapshot be created, the term requestor will be used for purposes of describing exemplary embodiments for creating snapshots and backup/restore operations.

Requestor 218 (which can be, in one embodiment, snapshot generator 208) communicates with a shadow copy service 220, which is an operating system service that participates in the generation of a single snapshot of a client. In the case of a shadow copy service, a snapshot can also sometimes be referred to as a shadow copy or a virtual volume. The copy service 220 identifies for the requestor 218 on which volumes the data corresponding to the selected backup groupings is located. As discussed above, the VSS volume, for example, may involve data that is located on one or more volumes that may or may not be included in the modified listing. The copy service 220 identifies all of the volumes that should be included in the single snapshot. The requestor 218 then identifies these volumes in a copy set.

In one example, assume that the data for the VSS volume is located on the C drive and the D drive and the user requests a backup of the C drive (associated with writers), D drive (associated with writers), G drive (not associated with writers), and VSS volume (associated with writers). The resulting copy set would include the C drive volume, D drive volume and G drive volume. No other volumes would be required to be included in the copy set because the information for VSS is already contained in the C drive volume and D drive volume. In another example, suppose the user only selects the D drive, G drive and VSS volume to be backed up. The copy set would include the C drive volume, D drive volume and G drive volume. In this example, the C drive volume is included in the copy set because information relating to the VSS volume is contained on the C drive. Further, in another example, a user could simply select the VSS volume (or a sub-grouping thereof) to be backed up. The copy set would include any volume containing information relating to the VSS volume grouping, such as the C drive volume and D drive volume. Finally, in one embodiment, any application with writers can be included in the VSS volume. However, it will be appreciated that the VSS volume does not have to include all applications and/or services that include writers and that they may be included in other volumes. In this situation or in other operating systems where applications or services with writing components are not grouped within a VSS volume equivalent, it is possible for a user to only select backup groupings that could or could not be associated with any writers but are not associated with any VSS backup groupings. The copy set would thus consist of only these volumes corresponding to these backup groupings.

Thus, the foregoing examples are provided to illustrate that a volume can be included in a copy set even if it is not originally selected by a user to be backed up because another backup grouping (e.g., the VSS volume) may require information relating to that volume in order to be backed up. In addition, both volumes associated with writers (e.g., C and D drive) and volumes not associated with writers (e.g., the G drive) can be included in a copy set. The examples of the C, D and G drives being or not being associated with writers or having VSS information stored thereon is only provided by way of example and it should be understood that the C and D drives do not have to be associated with writers and the G drive described as not being associated with writers could actually be associated with writers in other design configurations or that they may not have operating system state information stored thereon. Further, while copy sets have heretofore been described as including an indication of entire volumes or main directories, it should be understood that less than an entire volume or directory may be included in a copy set and, hence, included in a single snapshot so long as the information required to save a backup grouping is contained in the copy set or single snapshot.

Identifying volumes corresponding to backup groupings may require the copy service 220 to enumerate writers related to each backup grouping to determine which writers are active on the client. Copy service 220 communicates with a plurality of writers 222-224. Writers 222-224 are associated with at least one application or service and at least one backup grouping. The writers 222-224 provide metadata that include the writer's name, items or data such as files and components to back up, what items or data are to be excluded from the backup, and/or the methods for handling components and applications during backup and restore. The writers 222-224 also identify the type of application or service that is being backed up.

A writer may be associated, for example, with a mail server, a database, an operating system component, or other application or data store. Although embodiments of the invention can be implemented in connection with other operating systems and computers that provide writers or similar functionality, one example of an operating system that employs writers is Windows®. In this manner, the copy service 200 is able to receive metadata from each writer that is active on the client, which, in turn, assists the copy service 220 to identify the volumes related to the VSS volume or any other volume associated with writers.

Once the copy set is identified, copy service 220 then communicates with storage 210 on the client. The physical volume 212 in storage 210 contains data corresponding to at least one of the backup groupings. After a consistent set of data is stored in the physical volume 212, a snapshot 214 is created, reflecting a representation or replica of the consistent data in the physical volume. Requestor 218 is also able to communicate with storage 210 to access the single snapshot 214 that is saved in storage 210.

Turning to FIG. 6, an exemplary method for creating a snapshot using, for example, the system illustrated in FIG. 5 will now be described. At 602, the requestor 218 typically begins by interfacing with the copy service 220 which assists the requestor 218 in generating a copy set from the volumes corresponding to the selected backup groupings. Volumes corresponding to backup groupings that do not include writers are added to the copy set. When one or more selected backup grouping has writers, volumes corresponding to these backup groupings are identified by querying each writer in the backup grouping for information describing how the associated data should be backed up as well as information identifying which data is to be backed up. With regard to FIG. 6, copy service 220 enumerates the writers 222-224 that are currently active on the client to identify the volumes associated with writers. The writers 222-224 that are active on a client can be discovered dynamically. The content of the backup groupings can be populated dynamically in this case based on the discovered writers.

Thus, at 604, the copy set is generated by identifying volumes that need to be included as part of the snapshot of the client. Thus, the copy set can include, but is not limited to, identifying volumes for backup groupings not having writers and/or identifying volumes for backup groupings that do have writers, or both. After the copy set is generated, the requestor 218 is ready for the snapshot to be created. Because the copy set will identify the volumes corresponding to the backup groupings, the single snapshot will contain an exact representation of all of the volumes corresponding to the selected backup groupings being backed up for a particular client.

At 606, a snapshot of the relevant volumes identified in the copy set is executed. The backup groupings associated with the backup operation are processed at the same time to identify the volumes to be included in a single snapshot. Before executing the snapshot, however, the shadow copy service 220 notifies the writers 222-224 that the snapshot is going to occur, and the writers are then instructed to pause or freeze the corresponding application or service such that the data of the client can reach a consistent state by, for example, pausing new transactions, finishing current transactions, flushing the cache to disk, and the like. The requestor 218 then instructs the shadow copy service 220 to create a snapshot. After a consistent state is reached, the snapshot may be executed. After the snapshot is complete, the writers 222-224 may resume activity. Since a snapshot is a representation of the data stored on the client for one or more volumes, the data contained in an executed snapshot will also be referred to as "snapshot data."

As the snapshot is being generated, at 608, a metadata file is generated from the information obtained from the copy set. The metadata file is a map that identifies the items or data to be backed up as well as, in some instances, items or data that is to be excluded from the backup. The metadata files often include instructions for an appropriate restore operation. Where volumes on the copy set and snapshot are associated with writers, the metadata file includes writer data that is gathered before the snapshot is created. The writer data is not written to a file until the creation of the single snapshot is successful. Where the volumes in a copy set and, hence, the snapshot, do not correspond with any writers, the metadata file will not include writer data.

At 610, the client component 202B adds the metadata file to the snapshot data, forming a modified snapshot file. This involves adding each of the writer files (if present), backup groupings selected to be saved, mapping of physical volumes to the snapshot volumes, and mount points. This additional data may be modified or other data may be added depending on design considerations. The client component 202B generates a filename for the modified snapshot file.

5. Exemplary Backup and Restore Processes

Figure 7:
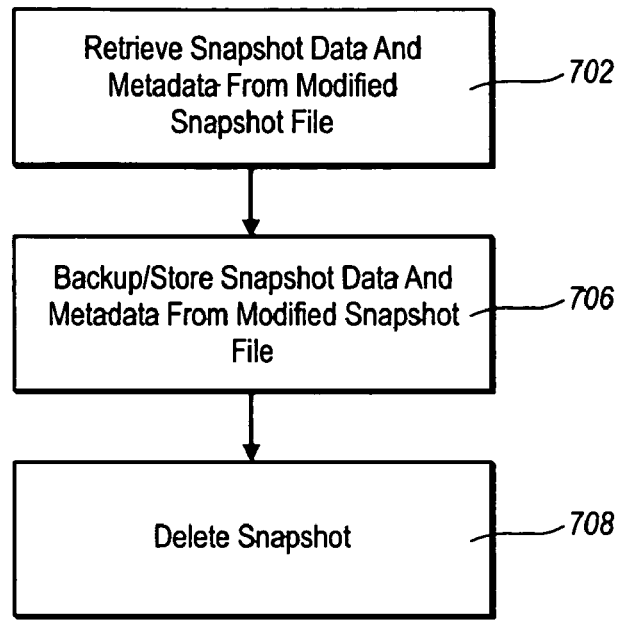
FIG. 7 is an exemplary flow chart for backing up data.

The processes of backing up and restoring client data will now be discussed in further detail. Again, an exemplary description will be provided using the Windows® operating system. However, the teachings herein apply equally to other operating systems. With reference to FIG. 7, an exemplary backup process is illustrated. As discussed above, one aspect of the present invention relates to creating a single snapshot which contains snapshot data along with metadata relating to the selected backup groupings in a modified snapshot file. The modified snapshot file is stored on, for example, client 108 for use in saving backup groupings related to data stored on client 108. The modified snapshot file can include an XML description of the snapshot data and the restore method.

At 702, when a request to save a particular backup grouping is made, the requestor 218 identifies the requested data objects or writers corresponding to a requested backup grouping to be saved. The requestor 218 gathers the metadata to save the grouping from the modified snapshot file relating to the requested data objects or identified writers. In one embodiment, the modified snapshot file only identifies active writers. The modified snapshot file may include information relating to the individual selectability of the writer components. For example, the modified snapshot file may indicate that some of the writer components should be selected together for backup or recovery. In another example, some writer components may be individually selectable for recovery, but may not be individually selectable for backup.

At 706, the backup application then makes a backup copy of the items and metadata identified in the modified snapshot file, saving the files from the single snapshot for that particular backup grouping. As described above with reference to FIG. 4A, the client references the same snapshot to locate the snapshot portion corresponding to a particular backup grouping. The backup is stored in backup storage 204. Thus, the saved data with respect to each backup grouping contains only the snapshot data and metadata corresponding that backup grouping and not for the others that are also included on the single snapshot. To access a particular version of the client's data, the backup storage may be configured to store multiple representations of the client's data. In other words, point in time representations of the client's data can be reconstructed. At 708, after the backup is complete, the single snapshot may be deleted.

The interface 302C or 302D illustrated in FIGS. 3C and 3D may also be used to initiate a recover operation. Because the operating system is typically backed up as a logical unit, the operating system is usually recovered as a unit. As previously indicated, each writer's metadata is saved as part of the backup operation. The metadata can be used to determine whether the restore is related to a snapshot backup operation.

Figure 8:
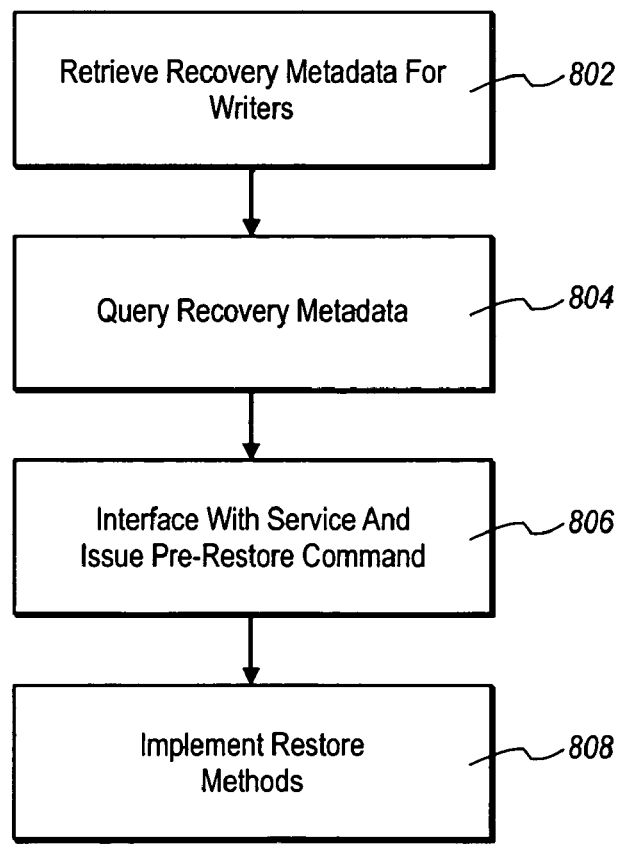
FIG. 8 is an exemplary flow chart for restoring data.

FIG. 8 illustrates an exemplary method of a recover operation using Windows® operating system. At 802, the requestor 218 typically begins by retrieving what will be termed as recovery metadata. Generally, recovery metadata includes both the specific metadata gathered from live writers and the saved metadata gathered from the modified snapshot file that ends up including the specific writers/components that were included in the single snapshot. Because recovery metadata used in a recover operation is from the backed up data at the selected backup time, it is possible that it may include writers that are no longer present on the client or that are currently inactive on the client. However, these writers are typically restored because the client is being restored to the state of the selected backup time. This may also occur in the context of a disaster recover situation.

The recovery metadata is typically passed to the shadow copy service 220 and the service can then be queried during the recover operation. If mount points exist within a writer's list of saved files, a mount point file containing the mount point and the volume it points to is recovered before any writer data is recovered. The mount points may be needed to properly restore or recover writer data.

At 804, the recovery metadata is then queried as the recover operation continues. The recovery metadata is queried, for example, to determine the restore method of a particular writer, the usage type, whether or not a reboot is required to restore the writer, and any potential alternate location mappings.

Next, at 806, the recover process interfaces with the shadow copy service and issues a pre-restore command. The pre-restore command informs writers that have writer components selected for recovery that a restore operation is imminent. The writers and the associated applications thus have an opportunity to prepare for the recover operation. At 808, the recover process then implements the restore method identified in the recovery metadata of each writer.

After the files have been copied during the recover operation, a post restore notification is issued to the affected writers. The writers can then perform post restore operations as applicable. At this point, the server may advise a reboot of the client system.

The interfaces 302C and 302D illustrated in FIGS. 3C and 3D are examples of methods for selectively identifying backup groupings, writers, and/or writing components for recovery. The selected backup grouping, writers, and/or writing components are examples of recovery items. The recovery operation then proceeds based on the writers that are included in the recovery items. The restore methods, for example, are implemented for each writer according to the recovery metadata associated with each writer. If a writing component has been deselected, then the corresponding portion of the recovery metadata may be disabled or ignored during the recovery operation. If operating specific backup groupings are selected for recovery, the recovery operation may prompt the user that all appropriate backup groupings, writers, and/or writing components are not selected to comply with the recommendation of restoring the operating system as a logical unit. The recovery operation may proceed, however, without selecting the recommended backup groupings.

When a component of a writer is not selected for restore, when a writer of a backup grouping is not selected for restore, or when a backup grouping does not have any associated writers, the recover process can ignore or disable the portion of the recovery metadata that corresponds to the unselected component or writer.

6. Exemplary Computing Systems

The present invention extends to both methods and systems for backing up data. The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes one or more clients in communication with a server that performs a backup operation of data from the one or more clients, the data being organized into backup groupings, a method for saving the data from a first client, the method comprising:
   generating a listing of backup groupings that are available for backup;
   receiving user input identifying multiple backup groupings for backup from the listing of backup groupings, wherein each backup grouping is associated with different writers that identify components for each backup grouping and wherein backup groupings that have interdependencies are identified in the listing of backup groupings;
   causing a backup manager module to generate a snapshot job request that serves as a command to the first client to generate a single snapshot, the snapshot job request including an indication of the multiple backup groupings to be saved in the single snapshot and the command to start components on the first client that generate the single snapshot for the multiple backup groupings; and
at the first client,
receiving the snapshot job request;
receiving an indication of the multiple backup groupings to be saved;
identifying one or more directories corresponding to the multiple backup groupings; and
requesting creation of a single snapshot using at least a portion of each of the one or more identified directories, wherein the single snapshot includes volumes corresponding to the multiple backup groupings;
creating a backup of each of the multiple backup groupings from the single snapshot, wherein the backup of each backup grouping is based from a same point in time of the single snapshot, creating a backup including:
the server sending the first client an individual save job request for each of the multiple backup groupings, each individual save job request identifying one of the multiple backup groupings to be backed up and including a filename of the single snapshot; and
for each individual save job request, the first client referencing the single snapshot to locate and backup a portion of the single snapshot corresponding to one of the multiple backup groupings; and
storing online indexes with the backup, wherein the online indexes includes a media volume that identifies an index of backup volumes associated with the single snapshot and a client file index that identifies an index of data items included in the backup of the data.

2. The method as recited in claim 1, wherein identifying one or more directories corresponding to the multiple backup groupings comprises:
enumerating one or more writers related to the multiple backup groupings that are active on the first client;
receiving metadata from the one or more writers that is active on the first client;
analyzing the received metadata to identify the one or more directories associated with the one or more writers; and
including the identified one or more directories in the request for creation of a single snapshot.

3. The method as recited in claim 1, wherein the snapshot job request comprises an identification of one or more directories to include in the request for creation of a single snapshot.

4. The method as recited in claim 1, further comprising executing the single snapshot of the at least a portion of each of the identified one or more directories.

5. The method as recited in claim 1, further comprising requesting deletion of the single snapshot.

6. The method as recited in claim 5, further comprising:
at the server, sending a terminating job request to the first client; and
at the client, receiving the terminating job request which initiates requesting deletion of the single snapshot.

7. The method as recited in claim 1, wherein the multiple backup groupings are received as a listing.

8. The method as recited in claim 4, further comprising causing each application associated with each writer to suspend operation while executing the single snapshot of the first client.

9. The method as recited in claim 8, further comprising:
causing each application to pause new transactions;
causing each application to finish performing current transactions; and
causing any cache associated with each application to flush to disk.

10. The method as recited in claim 8, further comprising causing each application associated with each writer to resume operation after the single snapshot is executed.

11. The method as recited in claim 1, wherein at least a portion of each of the identified one or more directories are included in a copy set and the request to create a single snapshot is made using the portions of the one or more directories identified in the copy set.

12. The method as recited in claim 1, wherein one or more directories include data relating to at least one of user data, system data, an operating system, an application, a service, the operating system state of the first client, components thereof, or a combination thereof.

13. The method as recited in claim 1, wherein receiving an indication of multiple backup groupings to be saved comprises allowing a user to select one or more backup groupings through a user interface.

14. In a system that includes one or more clients in communication with a server that stores a backup copy of the data from the one or more clients, the system comprising:
a backup application configured to perform backups of selected backup groupings on a client using a single snapshot of the selected backup groupings, the backup application residing on at least one of a server or a client, wherein the backup application generates a listing of backup groupings that are available for backup and wherein the listing of backup groupings is dynamically populated based on which writers are active at the at least one of the server or the client, wherein each backup grouping is associated with different writers that identify components for each backup grouping, wherein backup groupings that have interdependencies are identified in the listing of backup groupings and wherein writers operate with at least applications to store information on a storage device, wherein the backup application receives user input identifying the selected backup groupings for backup from the listing of backup groupings, wherein after creation of the single snapshot the backup application is configured to generate individual save job requests executed by the client for each selected backup grouping saved in the single snapshot, each individual save job request identifying one of the selected backup groupings to be backed up, wherein each backup of the selected backup groupings is based from a same point in time of the single snapshot;
a backup manager associated with the server and communicating with the backup application, the backup manager configured to generate a snapshot job request command to the client that a single snapshot of the selected backup groupings should be generated, the snapshot job request including a list of the selected backup groupings and the command to start certain components on the client that generate the single snapshot, wherein backup groupings that have interdependencies are all selected when one of the backup groupings that have interdependencies is selected;
a snapshot generator associated with the client, the snapshot generator configured to respond to the command that the single snapshot should be generated by requesting execution of the single snapshot, and the snapshot generator maintaining the single snapshot until an indication is received indicating that the single snapshot is no longer necessary; and
a storage device associated with the client and configured to maintain data of the client to be saved, wherein the data is one or more of directories, user data, system data, an operating system, an application, a service, the operating system state of the client, components thereof, or a combination thereof, wherein the backup manager stores online indexes with the data of the client, the online indexes including a media volume that identifies an index of backup volumes associated with the single snapshot and a client file index that identifies an index of data items included in the backup of the data.

15. The system as recited in claim 14, wherein the snapshot job request comprises an indication of which backup groupings are to be saved.

16. The system as recited in claim 14, wherein the snapshot job request comprises an indication of at least a portion of one or more directories from which a snapshot should be generated.

17. The system as recited in claim 14, further comprising means for executing a single snapshot configured to respond to the request from the snapshot generator to execute a single snapshot.

18. The system as recited in claim 17, wherein the means for executing a single snapshot comprises at least one of a system provider, hardware provider, or a software provider.

19. The system as recited in claim 17, wherein means for executing a single snapshot comprises a shadow copy service.

20. The system as recited in claim 19, wherein the shadow copy service is configured to:

enumerate one or more writers related to backup grouping that are active on the client;

receive metadata from the one or more writers that are active on the client; and identify one or more directories corresponding to the backup groupings having writers.

21. The system as recited in claim 14, the snapshot generator further configured to:

identify one or more directories corresponding to the multiple backup groupings; and compile at least a portion of each of the identified one or more directories in a copy set.

22. The system as recited in claim 19, wherein the snapshot generator is further configured to cause each application associated with each writer to suspend operation while executing the single snapshot of the client and to cause each application associated with each writer to resume operation after the single snapshot is executed.

23. The system as recited in claim 14, further comprising a user interface that allows a user to select the backup groupings on the client to be saved.

\* \* \* \* \*